United States Patent
Winter et al.

(10) Patent No.: US 6,424,604 B1
(45) Date of Patent: Jul. 23, 2002

(54) FAST DVD PROGRAM CHAIN ACCESS

(75) Inventors: Marco Winter; Harald Schiller, both of Hannover (DE)

(73) Assignee: Thomson Licensing SA, Boulogne Cedex (FR)

( * ) Notice: Subject to any disclaimer, the term of this patent is extended or adjusted under 35 U.S.C. 154(b) by 35 days.

(21) Appl. No.: 09/663,263

(22) Filed: Sep. 15, 2000

(30) Foreign Application Priority Data

Sep. 24, 1999 (EP) .............................. 99118846

(51) Int. Cl.$^7$ .......................... G11B 17/22; H04N 5/781
(52) U.S. Cl. ....................... 369/32.01; 386/125; 386/95
(58) Field of Search ................................ 369/32, 32.01, 369/275.3, 47.15, 47.19, 30.76, 59.11, 59.13; 386/95, 112, 125, 46, 126, 69, 70, 98, 111

(56) References Cited

U.S. PATENT DOCUMENTS

| | | | |
|---|---|---|---|
| 6,016,381 A | * | 1/2000 | Taira et al. ................... 386/95 |
| 6,112,009 A | * | 8/2000 | Kikuchi et al. ............... 386/95 |
| 6,308,005 B1 | * | 10/2001 | Ando et al. ................... 386/95 |

FOREIGN PATENT DOCUMENTS

| | | |
|---|---|---|
| EP | 0903744 A2 | 3/1999 |
| EP | 0926903 A1 | 6/1999 |
| EP | 0971535 A2 | 1/2000 |
| EP | 1021048 A2 | 7/2000 |
| WO | WO99/38166 | 7/1999 |
| WO | WO00/02195 | 1/2000 |

* cited by examiner

Primary Examiner—Ali Neyzari
(74) Attorney, Agent, or Firm—Joseph S. Triopoli; Harvey D. Fried; Francis A. Davenport

(57) ABSTRACT

According to the invention a method is proposed for fast accessing of a digital data stream representing video or audio information, in which parts of the stream information can be marked as temporarily erased. The invention includes a first table with address information of Stream Objects stored on a medium and information about temporarily erased Stream Objects. A second table contains address information of user defined Stream Objects, wherein said second table contains program related information and cells. The program related information includes a cell number of the first cell, which follows the last cell assigned to this program and wherein said cell includes the original cell number of the appropriate cell of said first table.

4 Claims, 1 Drawing Sheet

FAST DVD PROGRAM CHAIN ACCESS

BACKGROUND

In bitstream recording one is free to subdivide the bitstream into sub-units of more regular structure. Presentation data in DVDs (digital video or versatile disc) is organised into units called Video Object Unit, denoted VOBU, e.g. in the DVD Specifications for Video Recording. VOBUs have a variable size (data amount measured in number of sectors), but have also a variable duration (measured in number of video fields).

For data retrieval from the disc the DVD Specifications for Video Recording foresees a 'VOBU map' which is a table where for every VOBU in a recording, the length in sectors and the duration in fields is entered.

The directory and file structure of DVD Stream Recording is organised in Stream Data and Navigation Data of the DVD Stream Recording as follows:

Any DVD Streamer Device has certain requirements to store its own, Streamer-specific navigation data on the disc. These data are solely for helping the retrieval of recorded data; they need not be understood or even be visible to any outside Application Device.

Any DVD Streamer Device needs to communicate with the Application Device it is connected to. This communication should be straight forward, and as universal as possible, so that the maximum possible range of applications—both today and future—can be connected to the Streamer. The Navigation Data to support such communication must be understandable by the Streamer as well as by the Application Device; they will be called "Common navigation data" in the following.

The Streamer Device should offer to the connected Application Device a means for storing its own private data of any desired kind. The Streamer needs not to understand any of the content, internal structure, or meaning of this "Application-specific navigation data".

Navigation data is provided to control the recording, playing back, and editing of any bitstreams that are recorded. In DVD Stream Recording, Navigation Data is called "Streamer Information" (STRI). STRI consists of six kinds of information tables, namely Streamer Video Manager Information (STR_VMGI), Stream File Information Table (SFIT), Original Program Chain Information (ORG_PGCI), User Defined Program Chain Information Table (UD_PGCIT), Text Data Manager (TXT_DT_MG), and Application Private Data Manager (APD_MG).

The Stream File Information Table contains the information where on the recording media the stream data are recorded. The Original PGC Information has the function of a play list, which contains all takes which were made. A take is defined as containing the information between a start and a stop action in the sequence of recording or also called one program of the ORG_PGCI. In addition, a Stream Object (SOB) contains a full take or part of a take. With both tables the data can be retrieved for playback.

The User Defined PGC Information contains information, which are defined by a user.

In order to address more precisely a program contains one or more cells. A cell points to Stream Object Units (SOBU) and to each SOBU an Incremental Application Packet Arrival Time (IAPAT) is assigned.

SUMMARY OF INVENTION

It is one object of the invention to disclose a method for fast accessing of a digital data stream representing video or audio information.

A DVD Streamer is able to mark parts of the stream as temporarily erased (TE). These TE parts are both completely reconstructable and, permanently erasable as well as. The TE parts are not presented during playback, i.e. during playback the DVD streamer handles the TE parts as nonexistent.

Because TE parts are only marked inside the ORG_PGCI (Original Program Chain Information), a playback via the User Defined Program Chain Information (UD_PGCI), needs a view into the Original Program Chain Information (ORG_PGCI), in order to find out, whether the cells of the UD_PGCI points to TE parts or not, i.e. to find out, which parts of the cells of the UD_PGC may be presented and which parts must be skipped.

The current proposal for a specification of the DVD Streamer performs this via a Stream Cell General Information (SC_GI) of the Programs of a UD_PGCI.

The process to find out whether a Cell of the UD_PGCI Program #n contains TE parts:

1. summarise the number of Cells (C_Ns) of the Programs from Program #1 to Program #n−1 and go into the UD_PGCI Cell with this so derived number;
2. get SC_S_APAT (start time), SC_E_APAT (end time) and SOB_N (SOB number) from the SC_GI of this UD_PGCI Cell;
3. search inside ORG_PGCI for the Cell which points to the same SOB, i.e. compare SOB_N of the UD_PGCI Cell with SOB_N of the ORG_PGCI Cells;
4. investigate, whether SC_S_APAT and SC_E_APAT of the UD_PGCI Cell cover a TE part;
5. playback of the not temporarily erased parts between SC_S_APAT and SC_E_APAT.

The first step is a summation, which may need many UD_PGCI accesses. The third step is a search inside the ORG_PGCI, i.e. this step may need many ORG_PGCI accesses to find the desired Cell.

The invention proposes a way to speed up the first and the third step.

In order to speed up the first step the definition of C_Ns (number of Cells) is changed to "C_Ns is the summation of the number of Cells of its assigned Program and all previous Programs of this Program Chain". The definition change keeps the size of two bytes per C_Ns. The number of Cells of Program #n is equal to (C_Ns of Program #n)−(C_Ns of Program #n−1).

In order to speed up the third step the SOB_N of the UD_PGCI Cell is replaced by CELL_N (Cell Number). CELL_N also consists of 2 bytes and contains the Cell number of the appropriate ORG_PGCI Cell. So the access to the ORG_PGCI Cell can be performed without any search inside the ORG_PGCI.

With these two new definitions the process to find out whether a Cell of UD_PGCI Program #n contains TE parts is as follows:

1. get SC_S_APAT (start time), SC_E_APAT (end time) and CELL_N (Cell number) from the SC_GI of the UD_PGCI #(C_Ns of Program #n−1). Program #0 doesn't exist, therefore C_Ns of Program #0 shalt be treated as 0;
2. investigate, whether SC_S_APAT and SC_E_APAT of the ORG_PGCI Cell #CELL_N and all following ORG_PGCI Cells with the same SOB_N cover a TE part or not;
3. playback of the not temporarily erased parts between SC_S_APAT and SC_E_APAT.

Advantageously the playback process is simplified and contains only direct accesses to the Program Chains, i.e. the process needs no summation and no search. In addition there is no need of additional storage space for this invention.

DETAILED DESCRIPTION

Figure 1:
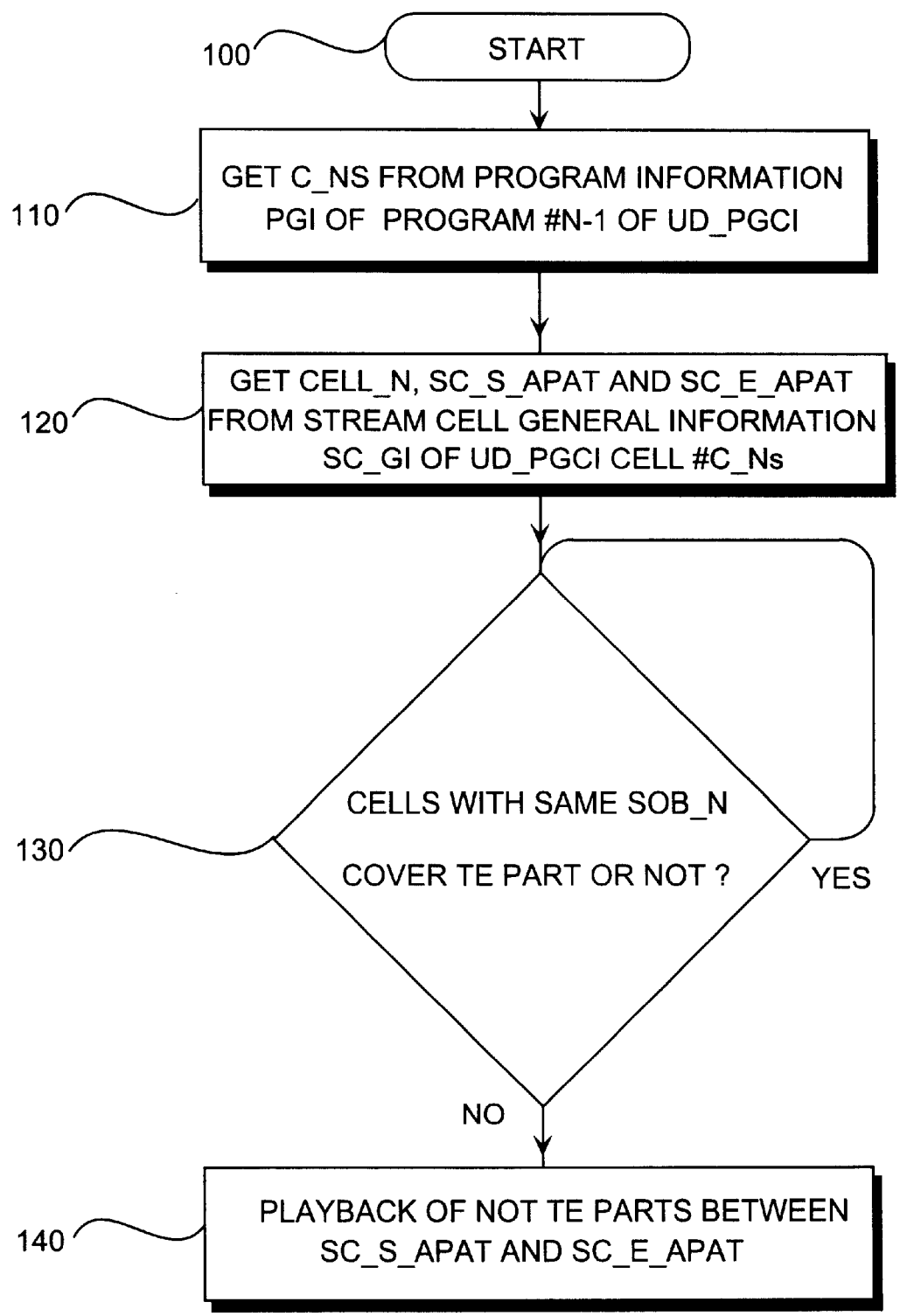
FIG. 1 is drawing showing applicants' inventive sequence for play back of non-temporarily erased information occurring between a start time and an end time. The sequence starts at step 100 and at step 110, a two byte word $C_{13}$ Ns is obtained which represents the number of Program cells of the Program and all previous Programs of this Program Chain. At step 120 a cell number, CELL_N, comprising two bytes and user defined start and end times represented by SC_S_APAT and SC_E_APAT respectively are obtained from the SC_GI of the UD_PGCI #(C_Ns of Program #n−1). A test is performed at step 130 to determine whether the ORG_PGCI Cell #CELL_N and all following ORG_PGCI Cells with the same SOB_N cover a temporarily erased part or not, i.e. if temporarily erased cells occur between the start and end times, If step 130 tests NO playback occurs between the start and end times. If step 130 tests YES the temporarily erased cells are not played and test waits for the next cell.

Exemplary embodiment to implement these invention into the DVD Streamer specification Version 0.5 is explained in more detail in the following description.

| Stream Cell General Information (SC_GI) of a UD_PGCI | | |
|---|---|---|
| | Contents | Number of Bytes |
| | reserved | 1 |
| (1) C_TY | Cell Type | 1 |
| (2) SC_EPI_Ns | Number of Entry Point Informations | 2 |
| (3) CELL_N | Original Cell Number | 2 |
| (4) SC_S_APAT | Stream Cell Start APAT | 6 |
| (5) SC_E_APAT | Stream Cell End APAT | 6 |
| | Total | 18 |

(1) $C_{13}$TY

Describes the Cell Type of this Stream Cell.

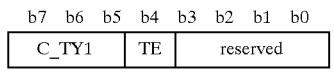

$C_{13}$TY1 ... '010b' shall be described for all Stream Cells.
TE ... '0b': This Cell is in the "Normal" state. '1b': This Cell is in "Temporarily Erased" state.

(2) SC_EPI_Ns

Describes the number of Entry Point Informations contained in this SCI.

(3) CELL_N

Describes the number of the Original Cell to which this Cell refers.

(4) SC_S_APAT

Describes the Start Application Packet Arrival Time (Start APAT) of this Stream Cell in DVD Stream Recording's PAT Describing Format.

(5) SC_E_APAT

Describes the End Application Packet Arrival Time (End APAT) of this Stream Cell in DVD Stream Recording's PAT Describing Format.

| Program Information (PGI) | | |
|---|---|---|
| | Contents | Number of Bytes |
| | reserved | 3 |
| (1) PG_TY | Program Type | 1 |
| (2) C_Ns | Number of Cells of this PG and all previous PGs | 2 |
| (3) PRM_TXTI | Primary Text Information | 128 |
| (4) IT_TXT_N | Index number of IT_TXT | 2 |
| | Total | 136 |

(1) PG_TY

Describes the Program Type of this Program.

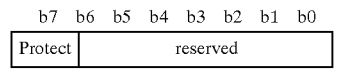

Protect ... 0b: This PG is not in the Protected state. 1b: This PG is in the Protected state.

Note that Protect and Temporal Erasure shall not be set at the same time. Therefore, a PG with one or more Cells in the Protected state shall not be brought into the Temporarily Erased state.

a PG with one or more Cells in the Temporarily Erased state shall not be brought into the Protected state.

(2) C_Ns

Describes the number of Cells of this PG and all previous PGs (if any) of this PGC. For example, if within a PGC, PG #1 contains 2 Cells, and PG #2 contains 3 Cells, then C_Ns of PG#1 is 2 and C_Ns of PG#2 is 2+3=5.

(3) PRM_TXTI

Describes the Primary Text Information for this PG. The first 64 bytes of this 128 bytes field are used for describing Primary Text in ASCII character set. If the Primary Text in ASCII is shorter than 64 bytes, the remaining bytes shall be filled with '00h'. The last 64 bytes of this 128 bytes field are used for describing Primary Text in the alternate character set. The alternate character set code is described in VMGI_MAT, and is shared by all Primary Text Information in this disc.

Note that control codes, which take values in the range from '01h' to '1Fh', shall not be described in PRM_TXTI.

(4) IT_TXT_N

Describes the index number of an IT_TXT of the TXT_DT_MG associated with this PG. If no IT_TXT iss associated with this PG, IT_TXT_N shall describe a value of (TBD).

What is claimed is:

1. Method for fast accessing of a digital data stream representing video or audio information, in which parts of the stream information can be marked as temporarily erased, including the steps of:

storing in a first table address information of Stream Objects stored on a medium and information about temporarily erased Stream Objects;

storing in a second table address information of user defined Stream Objects defining program chain wherein said second table contains program related information and cells; and said program related information includes a cell number which is the number of the first cell of the next program of said program chain, and wherein said cell includes an original cell number of the appropriate cell of said first table.

2. A method for fast accessing of a digital data stream representing video or audio information, in which parts of the stream information can be marked as temporarily erased, including the steps of:

storing in a first table address information of Stream Objects stored on a medium and information about temporarily erased Stream Objects;

storing in a second table address information of user defined Stream Objects wherein said second table contains program related information and cells, and said program related information includes a cell number of the first cell, which follows the last cell assigned to this program, and wherein said cell includes an original cell number of the appropriate cell of said first table;

loading said first and said second table into a memory;

receiving a selection command given by a user;

comparing said selection command with the program information stored in said second table;

obtaining information about the cell number from the previous program;

jumping to said cell represented by said cell number within said second table;

extracting the original cell number as well as start and end time of the desired Stream Objects;

jumping to said cell represented by said cell number within said first table;

comparing said extracted start and end time with start and end time of the original cell; and, selecting a stream of displayable content for playback.

3. The method according to claim 2, including the step of:

updating in playback mode the content of said second table stored in the memory with the content of said first table.

4. Method according to claim 3, including the step of:

mirroring said second table before being updated.

* * * * *